United States Patent
Horiuchi

(10) Patent No.: US 9,492,956 B2
(45) Date of Patent: Nov. 15, 2016

(54) THREE-DIMENSIONAL IMAGE FORMING APPARATUS AND THREE-DIMENSIONAL IMAGE FORMING METHOD

(71) Applicant: CASIO COMPUTER CO., LTD., Shibuya-ku, Tokyo (JP)

(72) Inventor: Yuji Horiuchi, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 316 days.

(21) Appl. No.: 14/035,627

(22) Filed: Sep. 24, 2013

(65) Prior Publication Data

US 2014/0110887 A1    Apr. 24, 2014

(30) Foreign Application Priority Data

Oct. 18, 2012  (JP) ................................. 2012-231034

(51) Int. Cl.

| B29C 44/02 | (2006.01) |
|---|---|
| B29C 35/08 | (2006.01) |
| B41J 3/28 | (2006.01) |
| B41J 3/407 | (2006.01) |
| B41J 11/00 | (2006.01) |
| B29C 44/04 | (2006.01) |

(52) U.S. Cl.
CPC ......... *B29C 44/022* (2013.01); *B29C 35/0805* (2013.01); *B29C 44/0407* (2013.01); *B41J 3/28* (2013.01); *B41J 3/4073* (2013.01); *B41J 11/002* (2013.01); *B29C 2035/0822* (2013.01)

(58) Field of Classification Search
CPC ...... H05K 1/16; H05K 3/125; H05K 3/1283; B29C 67/0059
USPC ............. 264/401, 112, 40.1; 425/375, 174.4
See application file for complete search history.

(56) References Cited

U.S. PATENT DOCUMENTS

| 6,280,171 | B1* | 8/2001 | Buazza ................... B29C 35/08 249/78 |
|---|---|---|---|
| 2004/0256754 | A1* | 12/2004 | Koguchi ....................... 264/40.1 |
| 2006/0249884 | A1* | 11/2006 | Partanen et al. .............. 264/401 |
| 2008/0206383 | A1* | 8/2008 | Hull et al. ..................... 425/135 |
| 2011/0260365 | A1* | 10/2011 | El-Siblani .......... A61C 13/0013 264/401 |
| 2013/0029103 | A1* | 1/2013 | Landry-Coltrain et al. .. 428/159 |

(Continued)

FOREIGN PATENT DOCUMENTS

| JP | 64-028660 A | 1/1989 |
|---|---|---|
| JP | 2001-150812 A | 6/2001 |
| JP | 2001150812 | * 6/2001 ........... B29C 44/022 |

*Primary Examiner* — Nahida Sultana
(74) *Attorney, Agent, or Firm* — Holtz, Holtz & Volek PC

(57) ABSTRACT

A three-dimensional image forming apparatus and a three-dimensional image forming method convert a specific portion selectively extracted from an image to be printed into an image of a color having a high thermal energy absorptivity, print the conversion image on a foaming layer side surface or a back face of a thermally expandable sheet, and form a three-dimensional image by irradiating light on the thermally expandable sheet from a light/heat irradiator having a light/heat irradiation temperature of a first body part lower than that of a second body part, in which an image density of an area in the conversion image of the specific portion corresponding to the first body part is controlled to be higher than an image density of an area in the conversion image of the specific portion corresponding to the second body part when the conversion image is printed on the thermally expandable sheet.

11 Claims, 6 Drawing Sheets

PRIOR TO FOAMING

(56) References Cited

U.S. PATENT DOCUMENTS

| | | | |
|---|---|---|---|
| 2013/0161874 A1* | 6/2013 | Horiuchi | 264/415 |
| 2013/0168903 A1* | 7/2013 | Horiuchi et al. | 264/413 |
| 2015/0070452 A1* | 3/2015 | Motoyanagi | B41J 11/002 347/102 |
| 2016/0107380 A1* | 4/2016 | Smoot | B29C 67/0059 264/401 |
| 2016/0144573 A1* | 5/2016 | Hirata | B29C 67/0088 428/411.1 |
| 2016/0167397 A1* | 6/2016 | Motoyanagi | B29C 51/00 347/9 |

* cited by examiner

PRIOR TO FOAMING

AFTER FOAMING

PRIOR TO FOAMING

AFTER FOAMING

THREE-DIMENSIONAL IMAGE FORMING APPARATUS AND THREE-DIMENSIONAL IMAGE FORMING METHOD

CROSS-REFERENCE TO RELATED APPLICATION

This application claims the benefit of Japanese Patent Application No. 2012-231034, filed on Oct. 18, 2012, the entire disclosure of which is incorporated by reference herein.

FIELD

This invention relates generally to a three-dimensional image forming apparatus and a three-dimensional image forming method, and more particularly, to a three-dimensional image forming apparatus and a three-dimensional image forming method for simply forming a three-dimensional image of high quality at low cost by selectively expanding a thermally expandable sheet.

BACKGROUND

Conventionally, a thermally expandable sheet (or thermally foamable sheet), in which a thermally expanding layer (or foaming layer) incorporating foamable microcapsules that is expanded by heating is formed on one face side of a substrate sheet, has been known. An image pattern having high optical absorptivity is printed on this thermally expandable sheet, followed by irradiation of light containing infrared radiation, and then a thermally expanding layer of an area corresponding to the image pattern is selectively heated and expanded, whereby a three-dimensional image corresponding to the image pattern is able to be formed on one face side of the substrate sheet.

With respect to such a three-dimensional image forming technique, for example, Unexamined Japanese Patent Application Kokai Publication No. S64-28660 describes a method for forming a three-dimensional image, in which a print image is formed on a surface of a thermally expanding layer side of a thermally expandable sheet or a back face of a substrate sheet side thereof using a black toner or ink having high optical absorptivity, and then the print image is caused to absorb light by light irradiation using a halogen lamp or the like to generate heat, whereby microcapsules of the thermally expanding layer in an area corresponding to the print image are heated and expanded (or foamed).

Further, for example, Unexamined Japanese Patent Application Kokai Publication No. 2001-150812 describes a method for adjusting a raised height of a three-dimensional image, in which a color image or the like is formed on a surface of a thermally expanding layer side of a thermally expandable sheet, and then a light absorption pattern including gray-scale images corresponding to pictures and others of the color image of the surface is formed on a back face of a substrate sheet side, followed by light irradiation from a back face side of the thermally expandable sheet to generate heat corresponding to shades of the light absorption pattern, whereby an expanded amount of the thermally expanding layer is controlled.

Incidentally, there is also proposed a method in which a three-dimensional image is initially raised on a thermally expandable sheet and then, for example, an ink of white which is a background color is coated on the entire face of a thermally expanding layer side or without such coating, a color image is formed thereon.

The method described in the aforementioned Unexamined Japanese Patent Application Kokai Publication No. 2001-150812 is considered to be able to form a three-dimensional image with any portions controlled to have any appropriate raised heights (foamed heights) in response to pictures of a color image and the like formed on a surface of a thermally expanding layer side of a thermally expandable sheet.

However, the present inventors have examined such methods for forming a three-dimensional image, and as a result, found a problem in which upon forming a three-dimensional image on a thermally expandable sheet by light irradiation using a long halogen lamp or the like, an expanded (foamed) height when a thermally expanding layer is expanded and raised differs from one to be expected, resulting in non-uniformity. This is a defect caused by a fact that a light/heat irradiation temperature of a longitudinal direction end portion of the halogen lamp for light/heat irradiation on the thermally expandable sheet is lower than in a central portion.

In general, a long halogen lamp is formed by enclosing a halogen heater power-supplied from its both end terminals in a glass tube. The distribution of its light/heat irradiation temperature indicates a constant temperature distribution in a certain distance from the central portion toward the end portion. However, naturally, the temperature markedly decreases in a vicinity of the end portion. Therefore, commonly, the halogen lamp is used in a constant temperature distribution range excluding both end portions.

However, such a manner causes a size of a three-dimensional image forming apparatus to depend on a dimension of the halogen lamp. Therefore, a problem to be solved that a size of the apparatus increases has been produced. Problems in the prior art will also be described in detail in an embodiment to carry out the invention to be described later.

SUMMARY

In view of the circumstances, the present invention has been completed. An object of the present invention is to provide a three-dimensional image forming apparatus and a three-dimensional image forming method capable of simply forming a three-dimensional image at low cost and of eventually realizing a three-dimensional image having desired high quality as a final image such as a color image and the like, in which in the case of forming a three-dimensional image by irradiating light on a thermally expandable sheet, even when uniform temperature distribution is not obtained due to a light/heat irradiation temperature of a first body part that is an end portion of a longitudinal direction lower than in a second body part that is a central portion as seen in a light/heat irradiator of a halogen lamp and the like arrayed along the longitudinal direction, a density of a conversion image to be printed for three-dimensional formation is adjusted so that an expanded (foamed) height when a thermally expanding layer of the thermally expandable sheet is expanded and raised is allowed to be constant.

To achieve the aforementioned object of the present invention, a three-dimensional image forming apparatus according to the present invention includes the following constitution:

an image extractor which selectively extracts a specific portion from an image to be printed;

an image converter which converts the specific portion extracted by the image extractor into an image of a color having a thermal energy absorptivity higher than those of portions other than the specific portion;

a conversion image printer which prints a conversion image converted by the image converter on a foaming layer side surface or a back face of a thermally expandable sheet;

a light source unit including a light/heat irradiator having a light/heat irradiation temperature of a first body part lower than that of a second body part, wherein a three-dimension image is formed by expanding the foaming layer side surface corresponding to the conversion image with thermal energy generated in the printed conversion image by light/heat irradiation on the thermally expandable sheet printed with the conversion image by the conversion image printer; and a conversion image printing density controller which controls when a degree of expansion of the thermally expandable sheet is equally set over the specific portion, an image density of an area in the conversion image of the specific portion corresponding to the first body part of the light/heat irradiator to be higher than an image density of an area in the conversion image of the specific portion corresponding to the second body part of the light/heat irradiator.

To achieve the aforementioned object of the present invention, a three-dimensional image forming method according to the present invention includes the following constitution:

extracting selectively a specific portion from an image to be printed;

converting the extracted specific portion into an image of a color having a thermal energy absorptivity higher than those of portions other than the specific portion;

printing the converted conversion image on a foaming layer side surface or a back face of a thermally expandable sheet; and forming a three-dimensional image by expanding the foaming layer side surface corresponding to the conversion image with thermal energy generated in the printed conversion image by light/heat irradiation on the thermally expandable sheet printed with the conversion image, using a light source unit having a light/heat irradiation temperature of a first body part set to be lower than a light/heat irradiation temperature of a second body part, wherein when a degree of expansion of the thermally expandable sheet is equally set over the specific portion, an image density of an area in the conversion image of the specific portion corresponding to the first body part of the light/heat irradiator is controlled to be higher than an image density of an area in the conversion image of the specific portion corresponding to the second body part of the light/heat irradiator.

Thus, the three-dimensional image forming apparatus and the three-dimensional image forming method of the present invention produce an effect of simply and inexpensively forming printed matter at high quality where a desired portion of a color image is three-dimensionally formed even in a non-uniform temperature distribution in light/heat irradiation temperature, by controlling an expanded (foamed) height when a thermally expanding layer of a thermally expandable sheet is expanded and raised to be constant.

BRIEF DESCRIPTION OF THE DRAWINGS

A more complete understanding of this application can be obtained when the following detailed description is considered in conjunction with the following drawings, in which.

DETAILED DESCRIPTION

The three-dimensional image forming apparatus and the three-dimensional image forming method according to the present invention will be described in detail with reference to an embodiment.

<Three-Dimensional Image Forming Apparatus>

Figure 2:
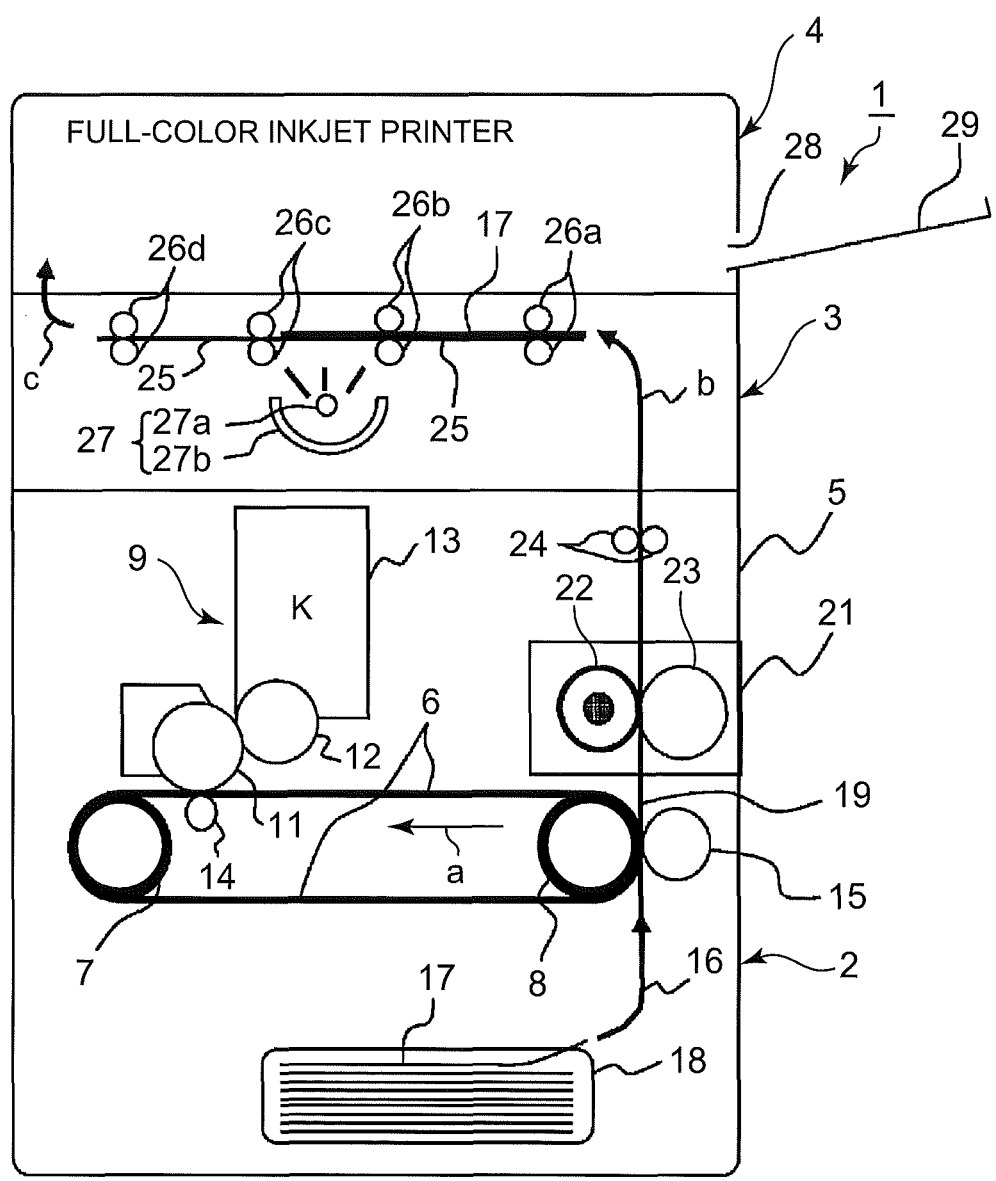
FIG. 2 is a cross-sectional view schematically illustrating an internal configuration of the three-dimensional image forming apparatus as the present embodiment.

FIG. 2 is a cross-sectional view schematically illustrating an internal configuration of the three-dimensional image forming apparatus as the present embodiment. As illustrated in FIG. 2, a three-dimensional image forming apparatus 1 includes a black toner printer 2 of an undermost portion, a thermal expansion processor 3 thereabove, and an inkjet printer 4 of an upmost portion.

The black toner printer 2 includes an endless transfer belt 6 extending horizontally in an interior center of an apparatus housing 5. While being stretched by a stretching mechanism not illustrated, the transfer belt 6 is wound around a drive roller 7 and a driven roller 8 and driven by the drive roller 7 to circularly move in a counterclockwise direction indicated by an arrow a of FIG. 2.

A photoreceptor drum 11 of an image forming unit 9 is disposed in contact with an upper circularly moving face of the transfer belt 6. A cleaner, an initialization charger, and an optical writing head each not illustrated, followed by a developing roller 12 and others are closely disposed in the photoreceptor drum 11 so as to surround its periphery.

The developing roller 12 is disposed in a side opening of a toner container 13. The toner container 13 accommodates a black toner K therein. The black toner K is composed of a non-magnetic single-component toner.

The developing roller 12 carries, on its surface, a thin layer of the black toner K accommodated in the toner container 13 and develops an electrostatic latent image formed on the periphery of the photoreceptor drum 11 by the optical writing head to form an image of the black toner K.

A primary transfer roller 14 makes pressure contact with a lower portion of the photoreceptor drum 11 via the transfer belt 6 to form a primary transfer portion in the contact area. The primary transfer roller 14 is supplied with a bias voltage from a bias power source not illustrated.

The primary transfer roller 14 applies, in the primary transfer portion, a bias voltage supplied from the bias power source to the transfer belt 6 and then transfers the image of the black toner K developed on the periphery of the photoreceptor drum 11 to the transfer belt 6.

The driven roller 8 wound by a right end portion of the transfer belt 6 as illustrated in FIG. 2 makes pressure contact with a secondary transfer roller 15 via the transfer belt 6 to form a secondary transfer portion in the contact area. The secondary transfer roller 15 is supplied with a bias voltage from a bias power source not illustrated.

The secondary transfer roller 15 applies, in the secondary transfer portion, a bias voltage supplied from the bias power source to the transfer belt 6 and then transfers the image of the black toner K primarily transferred to the transfer belt 6 to a printing medium 17 conveyed from a lower side of the figure as indicated by an arrow along an image formation conveyance path 16. A thermally expandable sheet is used as the printing medium 17 of the present example.

The printing medium 17 is stacked and accommodated in a printing medium accommodator 18 including a sheet feeding cassette and others. One sheet on top is removed using a sheet feeding roller and others not illustrated, sent to the image formation conveyance path 16, and further conveyed in the image formation conveyance path 16. Then, the image of the black toner K is transferred on the sheet while passing through the secondary transfer portion.

The printing medium 17 passed through the secondary transfer portion while the image of the black toner K is transferred thereon is conveyed to a fixer 21 along a fixing conveyance path 19. A heat roller 22 and a pressure roller 23 of the fixer 21 nip and convey the printing medium 17 while applying heat and pressure thereto.

Thereby, the printing medium 17 is subjected to fixing of the image of the black toner K secondarily transferred on a sheet surface of the medium and further conveyed by the heat roller 22 and the pressure roller 23, followed by conveyance by a fixer discharging roller pair 24 to be discharged to the heat expansion processor 3 of an upper side. Since a conveyance rate of the printing medium 17 (a thermally expandable sheet) in the fixer 21 is relatively large, heating by the heat roller 22 is unlikely to expand a black toner printed portion of the thermally expandable sheet.

A medium conveyance path 25 is formed in an upper portion of the heat expansion processor 3 and four sets of a conveyance roller pair 26 (26a, 26b, 26c, and 26d) are disposed along this medium conveyance path 25. And, a light source unit 27 is disposed below a substantially central portion of the medium conveyance path 25.

The light source unit 27 comprises a halogen lamp 27a and a reflecting mirror 27b having a substantially semicircular cross-section surrounding a lower half of this halogen lamp 27a.

In the present example, a halogen lamp of 900 W is used as the halogen lamp 27a and disposed 4 cm distant from a face of the printing medium 17 conveyed in the medium conveyance path 25. A conveyance rate of the conveyance roller pair 26 for conveying the printing medium 17 is 20 mm/sec. Under this condition, the printing medium 17 is heated at 100° C. to 110° C. and then a solid black printed portion (the solid black referred to here also includes a solid gray image in a density adjustment of the present invention) of the printing medium 17 is thermally expanded.

A conveyance rate of the printing medium 17 in the black toner printer 2 is large but a conveyance rate of the printing medium 17 in the heat expansion processor 3 is small. Therefore, the printing medium 17 is conveyed from the printing medium accommodator 18 sheet by sheet and is not continuously conveyed until termination of the conveyance in the heat expansion processor 3.

Therefore, the printing medium 17 conveyed to the heat expansion processor 3 remains only for a short period of time with bending in a conveyance path b between the fixer discharging roller pair 24 of the black toner printer 2 and a first conveyance roller pair 26a of the heat expansion processor 3, resulting in no disadvantage in conveyance as a whole.

The printing medium 17 having thereon the solid black printed portion thermally expanded and raised in the heat expansion processor 3 is sent in the inkjet printer 4 along a conveyance path c.

Herein, the conveyance roller pair 26 possibly comprises a long roller pair extending in a width direction of the printing medium 17 at right angles to the conveyance direction or a short roller pair for nipping only both side end portions of the printing medium 17 for conveyance.

Figure 3:
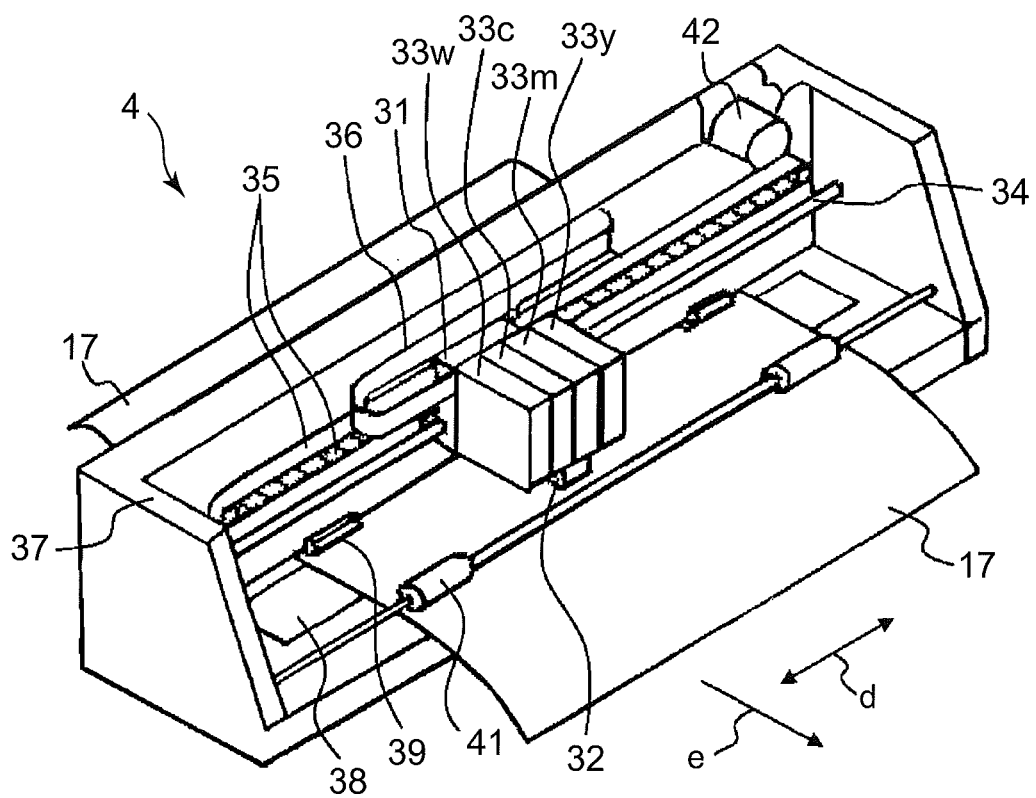
FIG. 3 is a perspective view illustrating a configuration of an inkjet printer of the three-dimensional image forming apparatus according to the present embodiment.

FIG. 3 is a perspective view illustrating a configuration of the inkjet printer 4. The inkjet printer 4 illustrated in FIG. 3 includes an inner frame 37 illustrated in FIG. 3 disposed between the conveyance path c and a medium discharging opening 28 provided externally with a sheet discharging tray 29 as illustrated in FIG. 2.

The inkjet printer 4 includes a carriage 31 disposed reciprocatably in a direction indicated by a two-headed arrow d at right angles to a sheet conveyance direction. The carriage 31 is attached with an ink cartridge 33 (33w, 33c, 33m, and 33y) accommodating a printing head 32 and an ink for printing.

The cartridges 33w, 33c, 33m, and 33y accommodate color inks of white W, cyan C, magenta M, and yellow Y, respectively. These cartridges are configured individually or integrally in one housing accommodating the respective ink chambers, and connected to the printing head 32 including nozzles each ejecting an individual color ink.

Further, the carriage 31 is slidably supported by a guide rail 34 on one side and fixed to a toothed drive belt 35 on the other side. Thereby, the printing head 32 and the ink cartridge 33 (33w, 33c, 33m, and 33y) are reciprocatively driven together with the carriage 31 in the direction indicated by the two-headed arrow d of FIG. 3 at right angles to the sheet conveyance direction, in other words, in a main scanning direction of printing.

A flexible communication cable 36 is connected between this printing head 32 and a controller, to be described later, of the three-dimensional image forming apparatus 1 via the inner frame 37. Through this flexible communication cable 36, printing data and a control signal are transmitted to the printing head 32 from the controller.

A platen 38 constituting a part of the sheet conveyance path is disposed, facing the printing head 32, in a lower end portion of the inner frame 37, extending in the main scanning direction of the printing head 32.

While being brought into contact with this platen 38, a printing medium 17 is intermittently conveyed in a printing sub-scanning direction indicated by an arrow e of FIG. 3 by use of a sheet feeding roller pair 39 (a lower roller is behind the printing medium 17 and therefore not viewed in FIG. 3) and a sheet discharging roller pair 41 (a lower roller is behind the printing medium 17 and therefore not viewed).

During suspended intermittent conveyance of this printing medium 17, while being driven by a motor 42 via the toothed drive belt 35 and the carriage 31, the printing head 32 ejects ink droplets onto a sheet face for printing at a state of being close to the printing medium 17. By repeating intermittent conveyance of the printing medium 17 and printing during reciprocation by the printing head 32 in this manner, printing is preformed over the entire face of the printing medium 17.

When full-color printing is performed on a white printed base to be described later, a printing medium 17 white-printed is reversely conveyed in an opposite direction of the printing sub-scanning direction indicated by the arrow e and then subjected to full-color printing while being re-conveyed in the arrow e direction.

Further, when full-color printing is performed on a surface thermally expanded and raised by heating from a back face of the printing medium 17 to be described later, using a printing medium reversing mechanism, not illustrated in FIG. 3, that is disposed above the inner frame 37, being similar to one used for common double-sided printing, the front and rear faces of the printing medium 17 conveyed through the conveyance path c from the heat expansion processor 3 are reversed.

Figure 4:
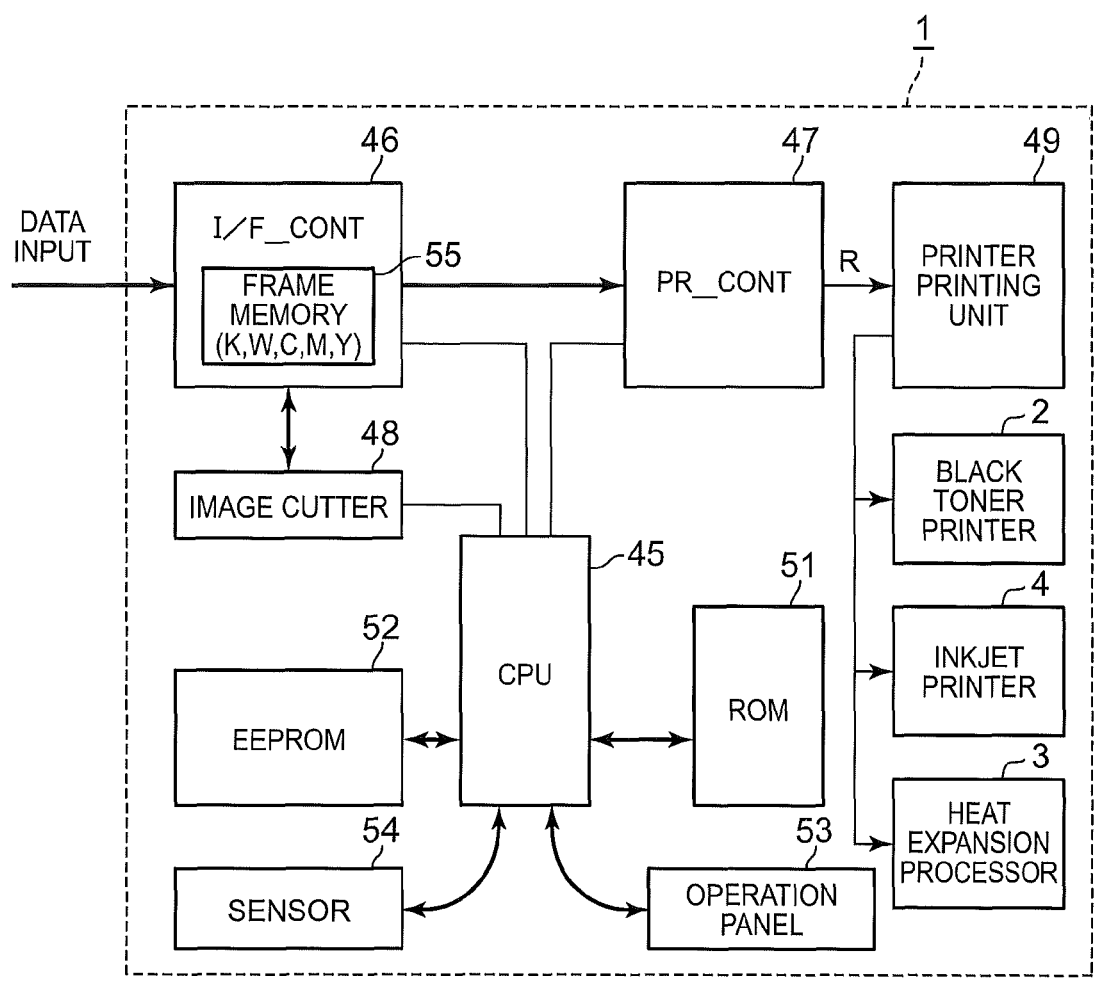
FIG. 4 is a circuit block diagram including a controller of the three-dimensional image forming apparatus according to the present embodiment.

FIG. 4 is a circuit block diagram including a controller of the three-dimensional image forming apparatus 1 as configured above. As illustrated in FIG. 4, in the circuit block, a CPU (central processing unit) 45 is centrally located and connected to an I/F_CONT (interface controller) 46, a PR_CONT (printer controller) 47, and an image cutter 48 via each data bus.

The PR-CONT 47 is connected to a printer printing unit 49. Further, the image cutter 48 is connected to the I/F_CONT 46 on the other side. This image cutter 48 is mounted with an image processing application similar to one mounted in a personal computer and the like.

Further, the CPU 45 is connected to a ROM (read only memory) 51, an EEPROM (electrically erasable programmable ROM) 52, an operation panel 53 of a body part operator, and a sensor 54 where an output from a sensor disposed in each component is input. The ROM 51 stores a system program. The operation panel 53 includes a touch display screen.

The CPU 45 reads the system program stored on the ROM 51 and controls each component in accordance with the read system program to execute processing.

In other words, in each component, initially, the I/F_CONT 46 converts print data supplied from a host device such as a personal computer and the like into bitmap data and develops the bitmap data on a frame memory 55.

On the frame memory 55, a memory area corresponding to each of print data of a black toner K and print data of color inks of white W, cyan C, magenta M, and yellow Y is set, and then the print data of an image of each color is developed on this memory area. The thus-developed data is output to the PR_CONT 47 and therefrom, output to the printer printing unit 49.

The printer printing unit 49 is an engine and controls, under a control from the PR_CONT 47, the photoreceptor drum 11 of the black toner printer 2 illustrated in FIG. 2, a rotation drive system including the primary transfer roller 14 and others, the initialization charger not illustrated in FIG. 2, an applied voltage for the image forming unit 9 including a driven unit such as an optical-writing head and others, and a drive output to a process load such as the drive of the transfer belt 6, the fixer 21, and others.

Further, the printer printing unit 49 controls the drive of four sets of the conveyance roller pair 26 of the heat expansion processor 3 illustrated in FIG. 2 and the light emission drive of the light source unit 27 as well as its timing. In addition, the printer printing unit 49 controls an operation of each component of the inkjet printer 4 illustrated in FIG. 2 and FIG. 3.

Then, image data of the black toner K output from the PR_CONT 47 is supplied from the printer printing unit 49 to the optical-writing head, not illustrated, of the image forming unit 9 of the black toner printer 2 illustrated in FIG. 2.

In the three-dimensional image forming apparatus 1 of the present invention, a dimension of a longitudinal direction of the light source unit 27 (halogen lamp 27a) is set to be as small as possible to coincide with a maximum size in a printing medium 17 used. Therefore, a light/heat irradiation temperature of the longitudinal direction of the light source unit 27 (halogen lamp 27a) is high in a central portion and low in an end portion.

Therefore, in the present invention, as described later, image data of the black toner K is subjected to a special printing control, as its density data, in response to the light/heat irradiation temperature of the end portion of the longitudinal direction of the light source unit 27 (halogen lamp 27a).

In other words, data (image data to be raised) cut in the image cutter 48 is not simply converted into a solid black image to be output from the PR_CONT 47. Instead, image data of an area corresponding to a uniform light/heat irradiation temperature in the central portion of the longitudinal direction of the light source unit 27 (halogen lamp 27a) is processed so as to be output from the PR_CONT 47 by adding white data to original data to obtain a solid gray image having a density lower than black, and when image data is present in an area corresponding to the end portion of the longitudinal direction of the light source unit 27 (halogen lamp 27a), the image data is processed and controlled by adding a black component in accordance with a light/heat irradiation temperature distribution to be output from the PR_CONT 47.

As a result, an expanded (foamed) height when a thermally expanding layer is expanded and raised is higher toward the end portion where a density of an image obtained via conversion image printing is larger, compared with the central portion. Therefore, the expanded (foamed) height is uniformly adjusted both in the end portion applied with less thermal energy from the light source unit 27 (the halogen lamp 27a) and in the central portion applied with more thermal energy therefrom.

Image data of each of the color inks of white W, cyan C, magenta M, and yellow Y output from the PR_CONT 47 is also supplied to the printing head 32 illustrated in FIG. 3.

<Three-Dimensional Image Forming Method>

Figure 5A:
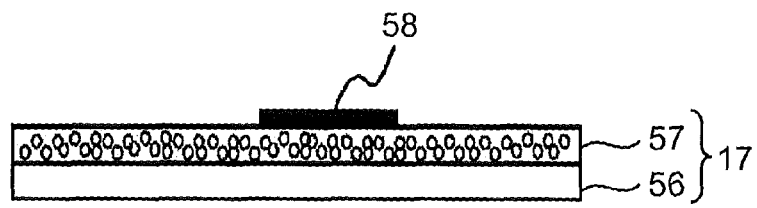
FIG. 5A, FIG. 5B, FIG. 5C, and FIG. 5D are views illustrating a basic concept of forming a three-dimensional image on a thermally expandable sheet according to the present invention.
Figure 5B:
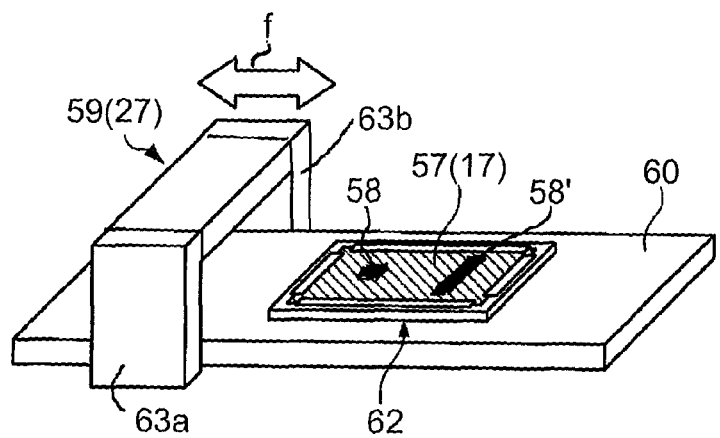
Figure 5C:
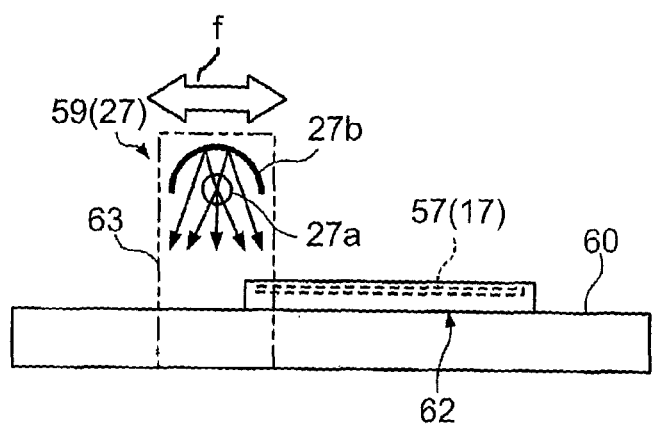
Figure 5D:
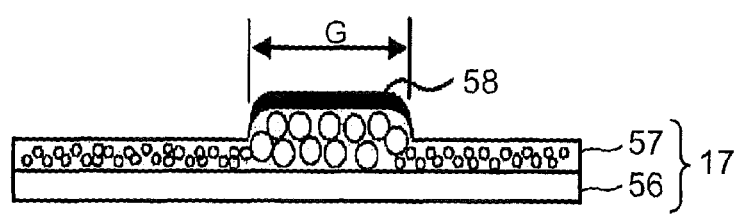

FIG. 5A, FIG. 5B, FIG. 5C, and FIG. 5D are views illustrating a basic concept of forming a three-dimensional face on a printing medium 17 in the three-dimensional image forming apparatus 1 as configured above. FIG. 5A is a view illustrating a configuration of the printing medium 17, FIG. 5B is a perspective view of a device for illustrating a process principle of selectively foaming and partially raising the printing medium 17, FIG. 5C is a side view of FIG. 5B, and FIG. 5D is a cross-sectional view illustrating a process result.

As illustrated in FIG. 5A, the printing medium 17 comprises a substrate 56 and a foaming resin layer 57 containing a thermally foaming agent coated on this substrate 56. The substrate 56 is formed of paper, cloth such as canvas and the like, or a panel material such as a plastic material and the like but the material thereof is not specifically limited. As the printing medium 17 comprising this substrate 56 and this foaming resin layer 57 containing a thermally foaming agent, any appropriate known product available on the market is employable.

On a portion where the foaming resin layer 57 of the printing medium 17 is intended to be three-dimensionally formed, a solid image 58 of a color having a high thermal energy absorptivity (for example, black) is printed in the black toner printer 2 of FIG. 2, depending on a degree of three-dimensional (expanded) formation. Then, as illustrated in FIG. 5B, a face of the foaming resin layer 57 of the printing medium 17 where the solid image 58 is printed is heated with a heat source heater 59.

FIG. 5B is a view illustrating a basic concept and therefore, illustrates a different configuration from that of the heat expansion processor 3 illustrated in FIG. 2, but the same principle is applied in both. In other words, as illustrated in FIG. 5B, the printing medium 17 is placed on a placing table 60 with a face where the solid image 58 of the black toner is printed up and is positioned and fixed by a sheet support frame 62.

A guide groove (not illustrated) is formed in an end face of each of both sides of the placing table 60. Heat source heater support columns 63 (63a and 63b) that are reciprocatable along the guide groove as indicated by a two-headed arrow f are vertically disposed.

The heat source heater 59, both end portions of which are supported by the heat source heater support column 63, irradiates thermal radiation onto a face of the foaming resin layer 57 of the printing medium 17 while moving in response to movement of the heat source heater support column 63. In other words, while the printing medium 17 and the heat source heater 59 relatively move, the face of the foaming resin layer 57 is irradiated with thermal radiation.

Thereby, the solid image 58 of the black toner absorbs thermal radiation, and then the heat is transferred to a thermally foaming agent contained in the foaming resin layer 57. Then, the thermally foaming agent induces thermal expanding reaction, and a portion G where the solid image 58 of the black toner is printed in the printing medium 17 is expanded and raised as illustrated in FIG. 5D.

In this manner, in the printing medium 17 heated by the heat source heater 59, based on a difference in thermal absorptivity between the portion G printed with the black toner and other non-printed portion, only the foaming agent in the portion G printed with the black toner is foamed and the printed face is three-dimensionally formed.

The heat source heater 59 of the present example constitutes a light source unit comprising the halogen lamp 27a and the reflecting mirror 27b as illustrated in FIG. 5C. With respect to the relative movement between the printing medium 17 and the heat source heater 59, in the aforementioned heat expansion processor 3, the light source unit 27 is fixed and the printing medium 17 is conveyed and moved by the conveyance roller pair 26.

Next, the data processing method and its operational effect according to the conversion image printing control in the three-dimensional image forming apparatus will be specifically examined with reference to a comparative example. Herein, to simplify the purport of the invention, in a thermally expandable sheet where a desired colored image is formed on a surface side, the case where a three-dimensional image is formed by uniformly expanding a thermally expanding layer of the surface side at a desired raised height will be described.

Initially, a three-dimensional image forming method serving as the comparative example is presented and its problem is examined. Thereafter, a feature and operational effect of the three-dimensional image forming method according to the present embodiment will be described.

Figure 6A:
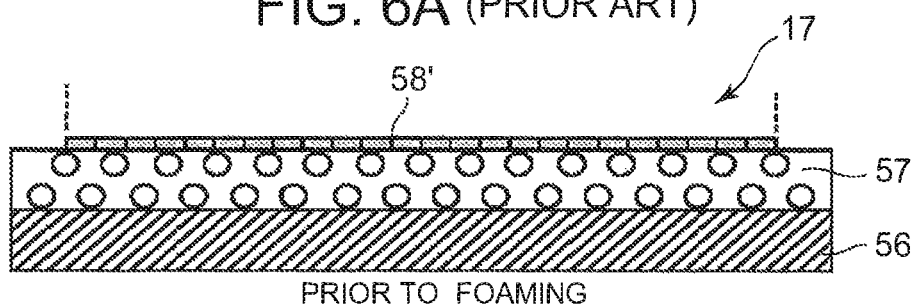
FIG. 6A, FIG. 6B, and FIG. 6C are views for illustrating a three-dimensional image forming method according to a comparative example.
Figure 6B:
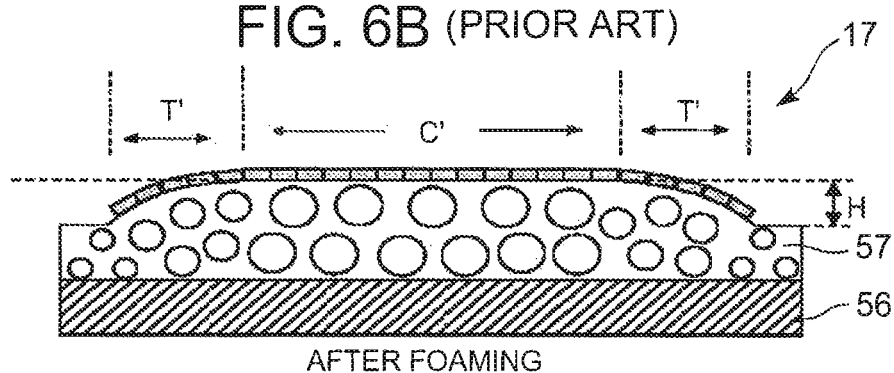
Figure 6C:
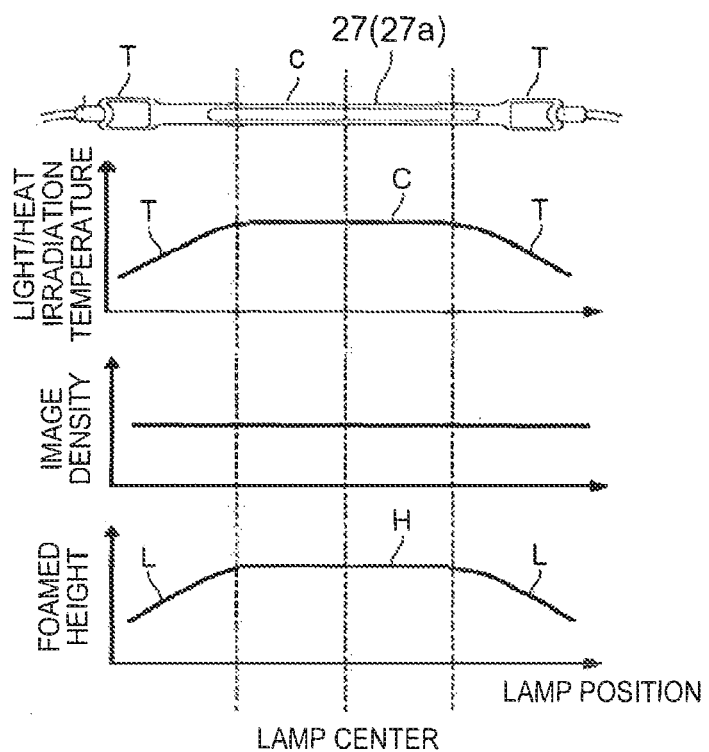

FIG. 6A, FIG, 6B, and FIG. 6C are views for illustrating the three-dimensional image forming method according to the comparative example.

In the three-dimensional image forming method as the comparative example of the present invention, instead of, for example, the solid image 58 illustrated in FIG. 5B, a solid image 58' spanning both end portions of a longitudinal direction of a printing medium 17 is printed along a longitudinal direction of the halogen lamp 27a of the heat source heater 59 (light source unit 27) to form a three-dimensional image. Herein, to simplify the description, a degree of three-dimensional formation (expansion) in the solid image 58' is considered to be equally set.

FIG. 6A is a cross-sectional view prior to foaming along the longitudinal direction of the light source unit 27 regarding the printing medium 17 printed with the solid image 58' and FIG. 6B is a cross-sectional view after foaming along the longitudinal direction of the light source unit 27 regarding the printing medium 17 printed with the solid image 58'. FIG. 6B and FIG. 6C are views illustrating a correlation among the light source unit 27, image density, and raised (foamed) height.

As illustrated in FIG. 6C, it is made clear that a light/heat irradiation temperature of the light source unit 27 is constant in a certain dimension of a central portion C but in both end portions T each, the temperature decreases toward the end portion. In contrast, when the printing medium 17 printed with the solid image 58' (with a constant image density, refer to FIG. 6C) as illustrated in FIG. 6A is irradiated with light and heat from the light source unit 27, as illustrated in FIG. 6B and FIG. 6C, a foamed height L in both end portions T' of the solid image 58' becomes lower than a foamed height H in a central portion C' thereof. In other words, the foamed height is determined in proportion to the light/heat irradiation temperature distribution of the light source unit 27.

Therefore, it has been found that when an image to be three-dimensionally formed is present in the end portion T' of the printing medium 17 corresponding to the end portion T of the light source unit 27, non-uniformity occurs in foamed height between the aforementioned image and an image to be three-dimensionally formed in the central portion. In this case, this problem is solved by allowing the light source unit 27 to be longer, resulting, however, in an increase in the size of the light source unit 27 itself and the apparatus. Therefore, as a result of the examinations, the present inventors have solved the problem by adjusting a print density of an image to be three-dimensionally formed in the printing medium 17 side.

In the three-dimensional image forming apparatus and the three-dimensional image forming method of the present invention, based on the examination matters and analysis results illustrated in FIG. 6A to FIG. 6C, an image density when a conversion image to be three-dimensionally formed is printed on a thermally expandable sheet is adjusted so that an end portion of a longitudinal direction in the thermally expandable sheet corresponding to the light/heat irradiator of the light source unit is printed at a density gradually higher than in a central portion.

Specifically, a print image of the thermally expandable sheet side corresponding to a central portion of the light source unit is adjusted at a density giving a gray image where basically, a black component is slightly decreased and also a print image in the thermally expandable sheet side corresponding to both end portions of the light source unit is set so as to become a black image where a black component gradually increases toward the end portion.

Figure 1A:
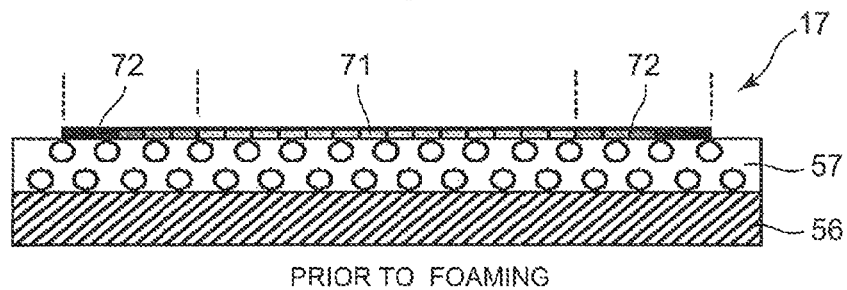
FIG. 1A, FIG. 1B, and FIG. 1C are views for illustrating a three-dimensional image forming method using a three-dimensional image forming apparatus as the present embodiment.
Figure 1B:
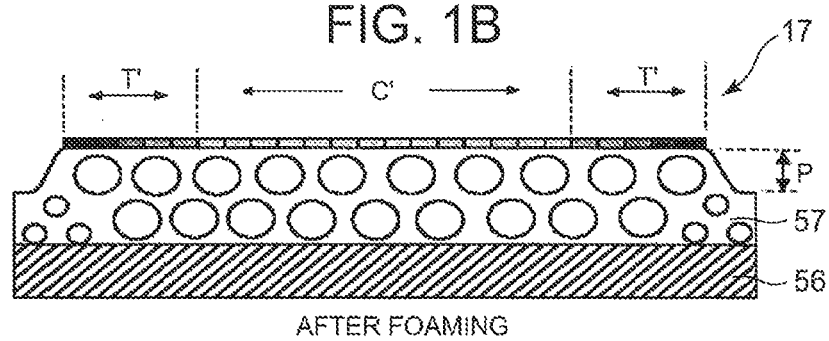
Figure 1C:
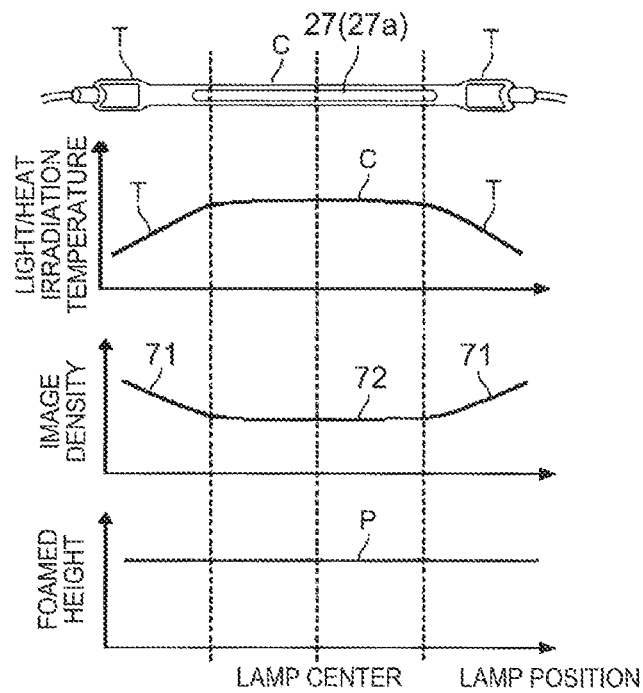

FIG. 1A, FIG. 1B, and FIG. 1C are views for illustrating the three-dimensional image forming method using the three-dimensional image forming apparatus as the present embodiment. The same configurations as in the aforementioned comparative example (refer to FIG. 6A to FIG. 6C) will be described with the same symbols.

In the three-dimensional image forming method according to the present invention, based on the aforementioned examination matters and analysis results, a data processing method is performed to adjust and set densities of gray to black components of an image formed on a thermally expandable sheet.

In other words, in the present invention, as illustrated in FIG. 1A, instead of the solid image 58' illustrated in FIG. 6A as the comparative example, a solid gray image 71 of a predetermined density is printed in a portion C' corresponding to the central portion C of the longitudinal direction of the light source unit 27 of the heat source heater 59 and then an image (solid gray to black) 72 density-adjusted in inverse proportion to a light/heat irradiation temperature distribution of the light source unit 27 is printed in portions T' corresponding to the both end portions T. In the present embodiment, description will be made with the following assumption: an image (a solid gray image 71 and a density adjusted image (solid gray to black) 72) spanning both end portions of a longitudinal direction of the printing medium 17 is printed and thereafter this image portion is raised (foamed), but in the same manner as in the description of the comparative example of FIG. 6A, a degree of the three-dimensional formation (expansion) is equally set.

FIG. 1A is a cross-sectional view prior to foaming along the longitudinal direction of the light source unit 27 regarding a printing medium 17 printed with a solid gray image 71 and a density adjusted (solid gray to black) image 72 and FIG. 1B is a cross-sectional view illustrating how the solid gray image 71 and the density adjusted (solid gray to black) image 72 each are foamed. FIG. 1C is a view illustrating a correlation among the light source unit 27, image density, and raised (foamed) height.

As illustrated in FIG. 1B and FIG. 1C, a light/heat irradiation temperature distribution of the light source unit 27 is constant in a certain dimension of a central portion C but in both end portions T each, the temperature decreases toward an end portion. In contrast, when the printing medium 17 printed with the solid gray image 71 and the density adjusted (solid gray to black) image 72 is irradiated with light and heat from the light source unit 27, raised (foamed) heights P in the central portion C' and both end portions T' of the printing medium 17 are corrected to be constant.

In the case of a condition where a black density and raised (foamed) height of an image to be foamed linearly vary, when an outermost end light/heat irradiation temperature of the halogen lamp 27a was set to be, for example, 70% of that of the lamp central portion, it was found that an image density in the outermost end was preferably set to be 1.4 times (100/70) of a density in the central portion.

Therefore, when, for example, a white ink of the background color is coated on an image uniformly raised (foamed) in this manner and thereafter a full-color image is formed, whereby a high-quality three-dimensional image is able to be formed.

The present invention is intended to control a density of an image of a color having a high thermal energy absorptivity in response to a light/heat irradiation temperature of the light/heat irradiator. Therefore, in the present embodiment, as described above, the case where a degree of expansion in a specific portion to be three-dimensionally formed is equally set has been described. However, the present invention is applicable to the case where the degree of expansion of the specific portion is set to differ in order to obtain a desired three-dimensional image totally exhibiting variety.

In addition, in the present embodiment, an example where an image to be three-dimensionally formed by being selectively extracted from an image to be printed is printed on a foaming layer side surface of a thermally expandable sheet has been described. However, it goes without saying that the present invention is applicable in the same manner to the case where mirror image printing is performed on a back face of an opposite side to a foaming layer of a thermally expandable sheet.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A three-dimensional image forming apparatus comprising:
   selectively extracts a specific portion from an image to be printed;
   converting the specific portion into an image of a color having a thermal energy absorptivity higher than portions of the image to be printed other than the specific portion, so as to form a conversion image;
   printing the conversion image on a foaming layer side surface or a back face of a thermally expandable sheet;
   forming a three-dimensional image by expanding the foaming layer side surface corresponding to the conversion image with thermal energy generated in the printed conversion image by light/heat irradiation on the thermally expandable sheet printed with the conversion image, using a light source unit having a first body portion with a light/heat irradiation temperature set to be lower than a light/heat irradiation temperature of a second body portion; and
   controlling a first density of a first area in the conversion image of the specific portion corresponding to the first body portion of the light source unit to be higher than a second density of a second area in the conversion image of the specific portion corresponding to the second body portion of the light source unit, whenin a degree of expansion of the thermally expandable sheet is equally set over an area corresponding to the specific portion.

2. The three-dimensional image forming method according to claim 1, wherein the light source unit comprises a light/heat irradiator disposed along a longitudinal direction of the light source unit, and light and heat are irradiated on the thermally expandable sheet while moving the light source unit relative to the thermally expandable sheet in a direction intersecting with the longitudinal direction.

3. The three-dimensional image forming method according to claim 2, wherein the image of the color having the higher thermal energy absorptivity is a gray to black image, and the first area in the conversion image of the specific portion corresponding to the first body portion is controlled to be printed at a density gradually closer to black from gray from the second area in the conversion image of the specific portion corresponding to the second body portion.

4. The three-dimensional image forming method according to claim 3, wherein the light/heat irradiation is performed using a halogen lamp which emits radiation including infrared wavelengths.

5. The three-dimensional image forming method according to claim 4, wherein the first body portion includes at least one end portion of the light/heat irradiator in the longitudinal direction, and the second body portion is a central portion of the light/heat irradiator in the longitudinal direction.

6. The three-dimensional image forming method according to claim 5, wherein the first body portion includes both end portions of the light/heat irradiator in the longitudinal direction.

7. The three-dimensional image forming method according to claim 3, wherein the first body portion includes at least one end portion of the light/heat irradiator in the longitudinal direction, and the second body portion is a central portion of the light/heat irradiator in the longitudinal direction.

8. The three-dimensional image forming method according to claim 2, wherein the light/heat irradiation is performed using a halogen lamp which emits radiation including infrared wavelengths.

9. The three-dimensional image forming method according to claim 8, wherein the first body portion includes at least one end portion of the light/heat irradiator in the longitudinal direction, and the second body portion is a central portion of the light/heat irradiator in the longitudinal direction.

10. The three-dimensional image forming method according to claim 2, wherein the first body portion includes at least one end portion of the light/heat irradiator in the longitudinal direction, and the second body portion is a central portion of the light/heat irradiator in the longitudinal direction.

11. The three-dimensional image forming method according to claim 1, wherein the first body portion includes at least one end portion of the light source unit in a longitudinal direction of the light source unit, and the second body portion is a central portion of the light source unit in the longitudinal direction.

* * * * *

UNITED STATES PATENT AND TRADEMARK OFFICE
CERTIFICATE OF CORRECTION

PATENT NO.        : 9,492,956 B2
APPLICATION NO.   : 14/035627
DATED             : November 15, 2016
INVENTOR(S)       : Yuji Horiuchi Page 1 of 1

It is certified that error appears in the above-identified patent and that said Letters Patent is hereby corrected as shown below:

In the Claims

Column 12, Line 17, delete "apparatus" and insert --method--.

Column 12, Line 19, change "extracts" to --extracting--.

Column 12, Line 28, delete "forming" and insert --foaming--.

Column 12, Line 41, delete "whenin" and insert --wherein--.

Signed and Sealed this
Twenty-first Day of February, 2017

Michelle K. Lee
*Director of the United States Patent and Trademark Office*